(12) United States Patent
Rahman et al.

(10) Patent No.: US 7,768,987 B2
(45) Date of Patent: Aug. 3, 2010

(54) APPARATUS AND METHOD FOR OPERATING FREQUENCY RESOURCES IN A MOBILE COMMUNICATION SYSTEM

(75) Inventors: Muhammad Imadur Rahman, Aalborg (DK); Ragnar Viôir Reynisson, Aalborg (DK); Frank Hanns Paul Fitzek, Aalborg (DK); Ramjee Prasad, Aalborg (DK); Jin-Kyu Koo, Suwon-si (KR); Dong-Seek Park, Yongin-si (KR); Young-Kwon Cho, Suwon-si (KR); Young-Kyun Kim, Seongnam-si (KR); Eun-Taek Lim, Suwon-si (KR); Jun-Young Jung, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 981 days.

(21) Appl. No.: 11/527,313

(22) Filed: Sep. 26, 2006

(65) Prior Publication Data

US 2007/0093252 A1    Apr. 26, 2007

(30) Foreign Application Priority Data

Sep. 26, 2005   (KR) ...................... 10-2005-0089562

(51) Int. Cl.
*H04B 7/208* (2006.01)

(52) U.S. Cl. ...................... 370/344; 370/252; 370/328; 370/485

(58) Field of Classification Search ................. 370/208, 370/252, 253, 310–350, 431, 437, 450, 480, 370/485

See application file for complete search history.

(56) References Cited

U.S. PATENT DOCUMENTS

| | | | | |
|---|---|---|---|---|
| 6,473,467 | B1 * | 10/2002 | Wallace et al. | 375/267 |
| 7,366,088 | B2 * | 4/2008 | Bolinth et al. | 370/203 |
| 7,515,878 | B2 * | 4/2009 | Zhang et al. | 455/69 |
| 2005/0232135 | A1 * | 10/2005 | Mukai et al. | 370/208 |
| 2005/0265290 | A1 * | 12/2005 | Hochwald et al. | 370/335 |
| 2006/0056360 | A1 * | 3/2006 | Parkvall et al. | 370/335 |
| 2006/0153283 | A1 * | 7/2006 | Scharf et al. | 375/148 |

* cited by examiner

*Primary Examiner*—Ricky Ngo
*Assistant Examiner*—Wei-Po Kao
(74) *Attorney, Agent, or Firm*—The Farrell Law Firm, LLP

(57) ABSTRACT

A frequency resource operating apparatus and method for transmitting and receiving data at a different hopping pattern speed according to a CSI in a BWA communication system are provided. In a method of transmitting and receiving data using CSI in a mobile communication system, a BS sets the CSI of an MS to an initial CSI and sends data to the MS according to the initial CSI. The MS sends a downlink CSI to the BS. The BS groups the MS based on the downlink CSI and sends data to the MS according to a hopping pattern for the group of the MS among hopping patterns preset for predetermined groups.

15 Claims, 8 Drawing Sheets

APPARATUS AND METHOD FOR OPERATING FREQUENCY RESOURCES IN A MOBILE COMMUNICATION SYSTEM

PRIORITY

This application claims priority under 35 U.S.C. §119 to an application filed in the Korean Intellectual Property Office on Sep. 26, 2005 and assigned Serial No. 2005-89562, the contents of which are incorporated herein by reference.

BACKGROUND OF THE INVENTION

1. Field of the Invention

The present invention relates generally to a mobile communication system, and in particular, to an apparatus and method for allocating subcarriers in a mobile communication system.

2. Description of the Related Art

Most of factors that impede high-speed, high-quality data services arise from channel environment in a wireless mobile communication system. The channel environment often varies due to Additive White Gaussian Noise (AWGN), fading which causes changes in the power of a received signal, shadowing, the Doppler effect resulting from the movement and frequent velocity change of a Mobile Station (MS), interference from other MSs, and multi-path interference.

Thus, an advanced technology is required for providing high-speed wireless data packet service. Obviously, techniques adopted in legacy mobile communication systems, such as Adaptive Modulation and Coding (AMC) and Hybrid Automatic Repeat Request (HARQ) remarkably improved overall system performance by adapting to the variant channel environment.

However, these techniques are not effective in solving the problem of shortage of radio resources. That is, a multiple access scheme with excellent spectrum efficiency needs to be developed in order to maximize system capacity and enable high-speed data transmission critical to multimedia service. Accordingly, a novel multiple access scheme is required which offers excellent spectrum efficiency and ensures data priority, for high-speed, high-quality packet data service.

An Orthogonal Frequency Division Multiple Access (OFDMA) mobile communication system allocates frequency resources to MSs on a subcarrier basis. Thus, the OFDMA mobile communication system can increase data rate under a given channel condition by use of the appropriate adaptation technique.

Yet, the dynamic channel allocation and dynamic resource allocation schemes of a typical OFDMA mobile communication system are intended for a fixed wireless network based on the assumption that MSs are fixed at predetermined positions. In this case, each MS reports the Signal-to-Noise Ratios (SNRs) of all subcarriers to a BS and the BS allocates subcarriers, i.e. subcarrier channels and resources to the MS based on the SNRs. When one or more subcarriers are allocated to a particular MS, it is assumed that the channel status of the subcarriers is kept unchanged.

In the OFDMA mobile communication system, the MS has to frequently report its Channel State Information (CSI) because of the time-variant property of channels. As a consequence, a joint bit, subcarrier, and signal power allocation algorithm based on full knowledge of channel status for the OFDMA mobile communication system brings about excess signaling overhead on the uplink. Moreover, the signaling overhead makes it impossible to implement such a subcarrier allocation scheme in practice.

Accordingly, there exists a need for developing a subcarrier allocation scheme for improving system performance with an appropriate level of overhead.

SUMMARY OF THE INVENTION

An object of the present invention is to substantially solve at least the above problems and/or disadvantages and to provide at least the advantages below. Accordingly, the present invention provides an apparatus and method for allocating subcarriers in a mobile communication system.

The present invention provides a subcarrier and band hopping method for providing a diversity gain in a mobile communication system.

The present invention provides a subcarrier and band allocation method for reducing the constraint of CSI transmission and increasing system data rate in a mobile communication system.

The present invention further provides an apparatus and method for defining CSI patterns and differentiating subcarrier hopping and band hopping pattern speeds in correspondence with the CSI patterns in a mobile communication system.

According to one aspect of the present invention, in a method of transmitting and receiving data using CSI in a mobile communication system, a BS sets the CSI of an MS to an initial CSI and sends data to the MS according to the initial CSI. The MS sends a downlink CSI to the BS. The BS groups the MS based on the downlink CSI and sends data to the MS according to a hopping pattern for the group of the MS among hopping patterns preset for predetermined groups.

According to another aspect of the present invention, in a method of transmitting and receiving data using CSI in a mobile communication system, a BS receives a random access signal from at least one MS, determines the CSI of the at least one MS to be an initial CSI, and allocates frequency resources to the at least one MS based on the initial CSI. The at least one MS sends data using the allocated frequency resources to the BS. The BS measures the CSI of the at least one MS operating based on the initial CSI and regroups the at least one MS according to the measured CSI. Then the BS allocates different frequency resources to groups according to the CSIs of the groups and sends data to the at least one MS.

According to a further aspect of the present invention, in a system for transmitting and receiving data using CSI in a mobile communication system, a BS groups MSs into predetermined groups according to the CSIs of the MSs, applies different hopping patterns to the groups according to the CSIs of the groups, and transmits and receives data to and from the MSs of the groups according to the hopping patterns applied to the groups. An MS transmits and receives data to and from the BS according to a hopping pattern determined for the MS by the BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1A:
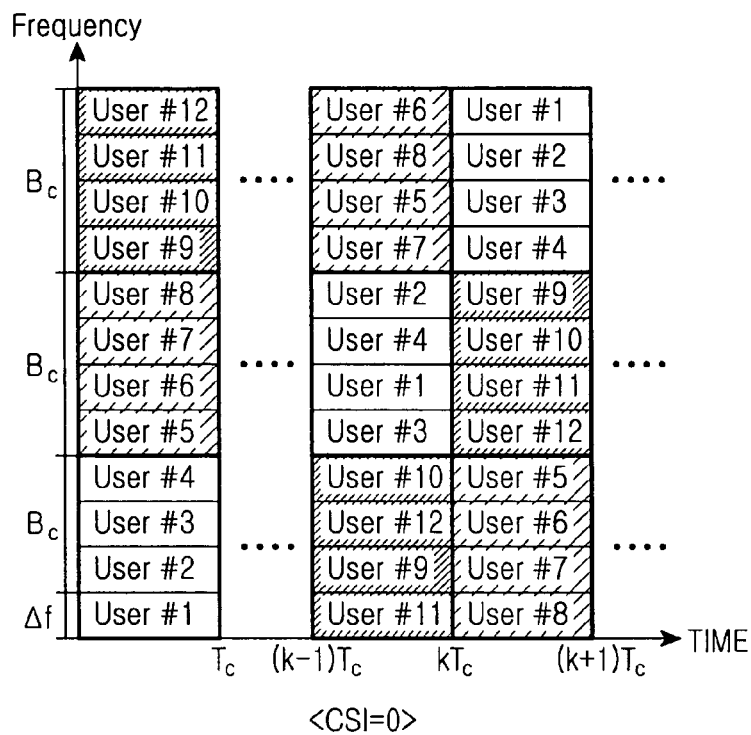
FIGS. 1A to 1D illustrate frequency hopping methods according to different CSIs in a Broadband Wireless Access (BWA) communication system according to the present invention.

Preferred embodiments of the present invention will be described herein below with reference to the accompanying drawings. In the following description, well-known functions or constructions are not described in detail since they would obscure the invention in unnecessary detail.

The present invention provides a frequency resource operating apparatus and method for defining CSIs according to a predetermined rule and allocating different hopping patterns to groups of MSs which are formed according to the CSIs. That is, frequency resources are operated by grouping MSs according to a predetermined criterion and allocating different bands to the groups. Frequency resources allocated to the MSs of each group are concurrently subject to band hopping and in-band subcarrier hopping in a predetermined method according to the present invention.

The present invention provides a resource allocation method for relieving the constraint of CSI transmission and at the same time, for increasing system data rate in an OFDMA mobile communication system. For this purpose, four CSIs are defined according to whether coherence time ($T_c$) and coherence bandwidth ($B_c$) are small or large. MSs having the same CSI are grouped into the same group. For the groups, a total frequency band is divided into a plurality of bands each having a predetermined size, and rules that differentiate band hopping and in-band subcarrier hopping pattern speeds according to the different CSIs are defined.

Now a definition of CSIs is made according to the sizes of coherence time ($T_c$) and coherence bandwidth ($B_c$) and allocation of subcarriers according to the CSIs is also made.

The CSIs can be defined as follows.

TABLE 1

| CSI | $T_c$ | $B_c$ |
|---|---|---|
| 0 | Large | Large |
| 1 | Large | Small |
| 2 | Small | Large |
| 3 | Small | Small |

Referring to Table 1, channel statuses are represented as combinations of a small or large coherence time and a small or large coherence bandwidth. Thus, the above four CSIs are defined.

"Large" and "Small" describe both relative lengths of coherence time with respect to a predetermined OFDM symbol duration, and relative sizes of coherence bandwidth with respect to the size of each of equal bands divided from a total band. Given a total band of W, $B_c$ is a size relative to the size B of equal G bands divided from the total band (B=W/G). While the four CSIs are classified herein, to which the present invention is not limited, any other classification is available.

In accordance with an embodiment of the present invention, MSs are grouped according to the CSIs listed in Table 1 above. MSs having the same CSI are grouped into one group and each group is allocated one band. Simultaneously with the band allocation, a different frequency is allocated to each group, as illustrated in Table 2.

TABLE 2

| CSI | Subcarrier Hopping | Band Hopping |
|---|---|---|
| 0 | FSCH | FBH |
| 1 | FSCH | SBH |
| 2 | SSCH | FBH |
| 3 | SSCH | SBH |

Table 2 illustrates subcarrier/band hopping rules for groups formed in correspondence with the CSI classifications illustrated in FIG. 1.

In Table 2, for CSI-based subcarrier hopping, Fast SubCarrier Hopping (FSCH) indicates fast hopping on a subcarrier basis, i.e. fast subcarrier hopping pattern speed and Slow SubCarrier Hopping (SSCH) indicates slow hopping on a subcarrier basis, i.e. slow subcarrier hopping pattern speed. For CSI-based band hopping, Fast Band Hopping (FBH) indicates fast hopping on a band basis, i.e. fast band hopping pattern speed and Slow Band Hopping (SBH) indicates slow hopping on a band basis, i.e. slow band hopping pattern speed. Absolute fast and slow values vary adaptively according to system situation.

CSI-based subcarrier/band hopping rules according to an embodiment of the present invention will be described referring to Table 1 and Table 2.

If $T_c$ is larger than a predetermined threshold, that is, CSI is 0 or 1 in Table 1, the channel changes slow. In this case, a diversity gain can be obtained by changing a carrier frequently. Therefore, fast subcarrier hopping, i.e. FSCH illustrated in Table 2 is applied. On the contrary, if $T_c$ is smaller than the threshold, that is, CSI is 2 or 3 in Table 1, the channel changes fast. In this case, the channel changes even if the carrier is kept unchanged, resulting in a diversity gain. Therefore, slow subcarrier hopping, i.e. SSCH illustrated in Table 2 is applied.

Similarly, if $B_c$ is larger than a predetermined threshold, that is, CSI is 0 or 1 in Table 1, the channel changes slow. In this case, a sufficient diversity gain cannot be obtained within a band and thus a carrier is changed frequently for the diversity gain. Therefore, fast band hopping, i.e. FBH illustrated in Table 2 is applied. On the contrary, if $B_c$ is smaller than the threshold, that is, CSI is 2 or 3 in Table 1, the channel changes fast. In this case, a sufficient diversity gain can be achieved within the band even if the band changes slowly. Therefore, slow band hopping, i.e. SBH illustrated in Table 2 is applied. The above hopping rules are illustrated in FIGS. 1A to 1D.

FIGS. 1A to 1D illustrate frequency hopping methods according to different CSIs in a mobile communication system according to an embodiment of the present invention.

As illustrated in FIGS. 1A to 1D, the horizontal axis represents time and the vertical axis represents frequency. $T_c$ on the time axis represents an OFDM symbol duration, and $B_c$ and $\Delta f$ on the frequency axis represent a bandwidth and a basic subcarrier hopping unit, respectively.

Figure 1B:
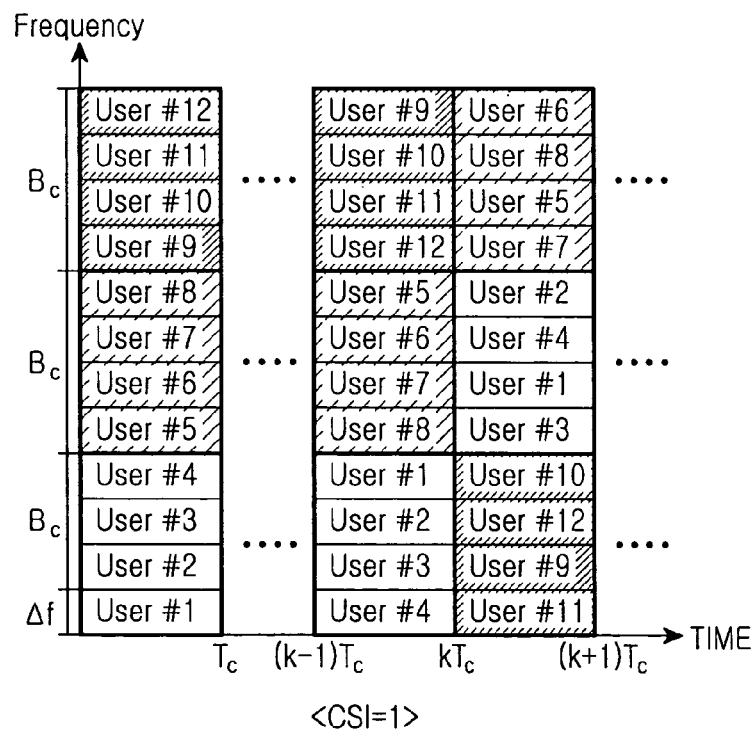
Figure 1C:
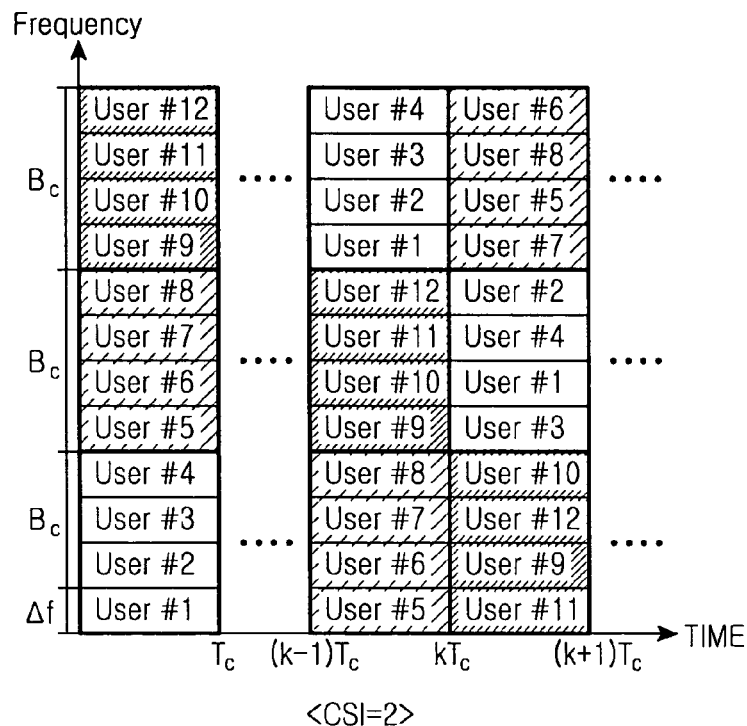
Figure 1D:
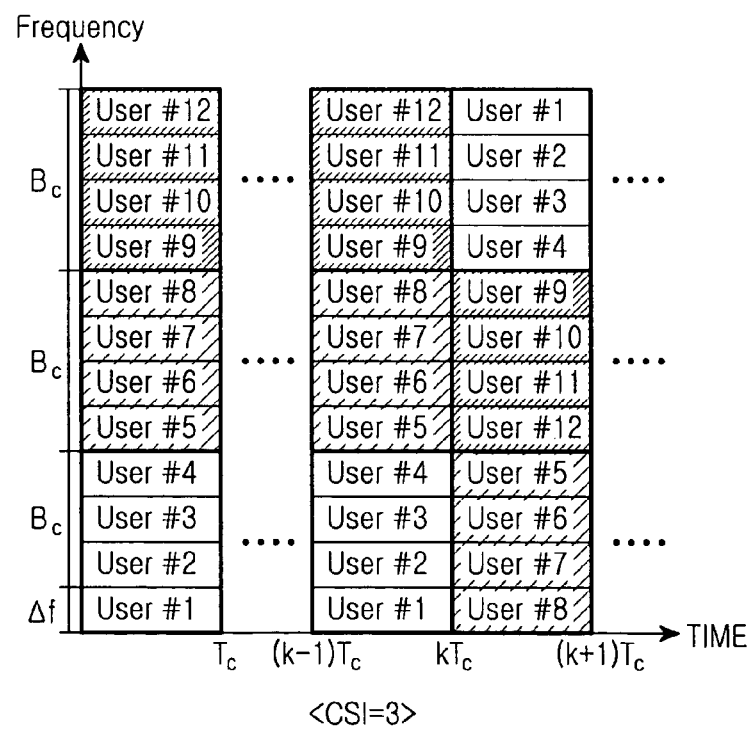

FIG. 1A illustrates a subcarrier/band hopping rule for CSI=0 defined in Table 1, FIG. 1B illustrates a subcarrier/band hopping rule for CSI=1, FIG. 1C illustrates a subcarrier/band hopping rule for CSI=2, and FIG. 1D illustrates a subcarrier/band hopping rule for CSI=3.

Referring to FIGS. 1A to 1D, FSCH/FBH applies for CSI=0, FSCH/SBH for CSI=1, SSCH/FBH for CSI=2, and SSCH/SBH for CSI=3.

Figure 2:
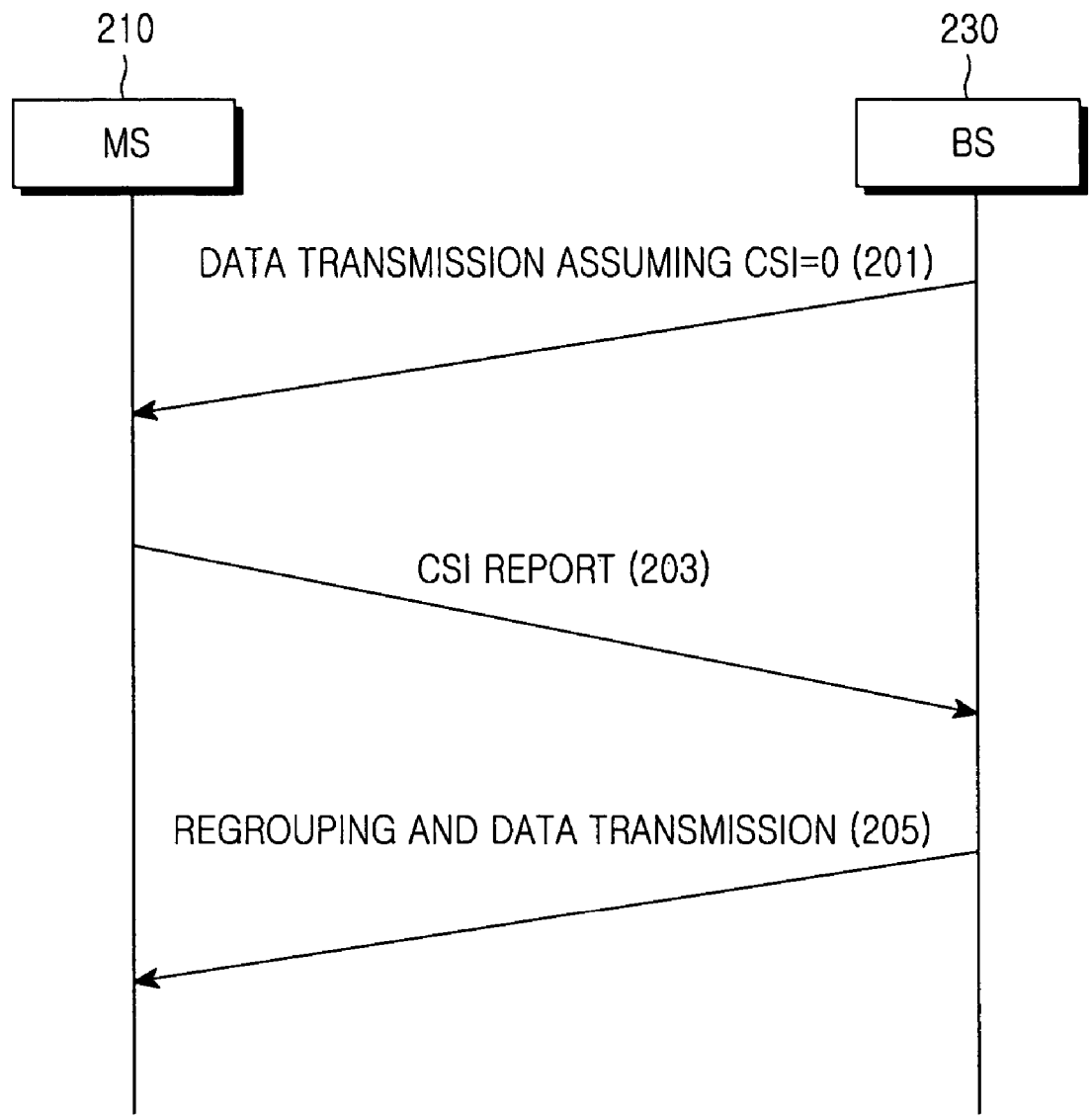
FIG. 2 illustrates downlink data transmission/reception according to frequency hopping rules according to the present invention.

FIG. 2 illustrates downlink data transmission/reception according to frequency hopping rules according to an embodiment of the present invention.

Before describing FIG. 2, it is made clear that for notational simplicity, data transmission/reception between one BS and one MS is shown in FIG. 2, to which the present invention is not limited. Thus, it is unequivocal that the present invention is applicable to data transmission/reception between two or more MSs and two or more BSs.

Referring to FIG. 2, since BS 230 has not acquired the CSI of MS 210 yet, it sends data to MS 210 on the assumption that the CSI is 0 in step 201. Upon receipt of the data, MS 210 retrieves its CSI and reports the CSI to BS 230 in step 203. How MS 210 measures the CSI is beyond the scope of the present invention and thus will not be described in detail herein.

BS 230 reconfigures the group to which MS 210 belongs according to the received CSI and sends data to MS 210 according to a hopping rule corresponding to the CSI in step 205. That is, BS 230 regroups MSs based on CSIs received from them and sends data to the MSs according to the hopping rules specified in Table 2.

Figure 3:
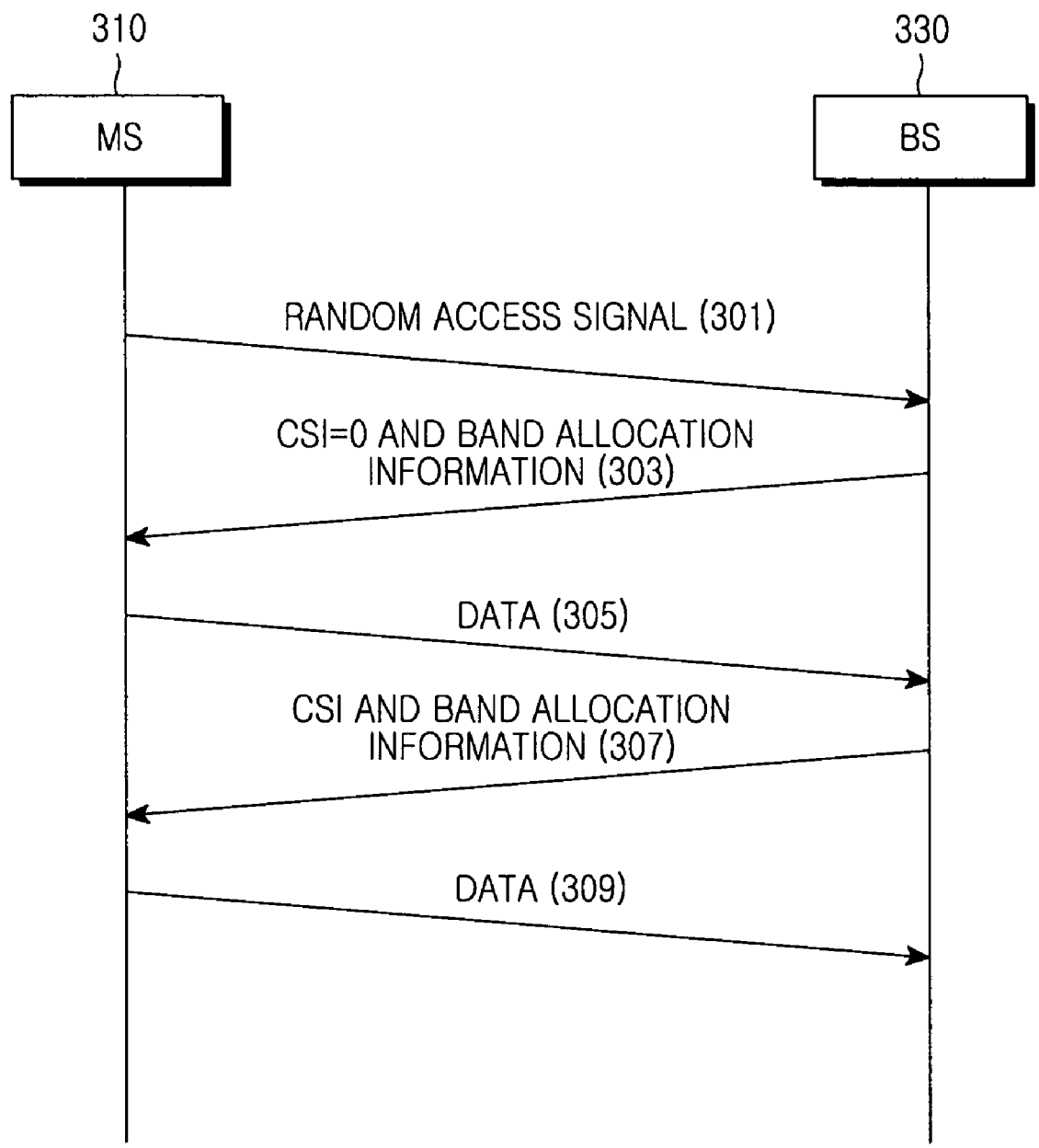
FIG. 3 illustrates uplink data transmission/reception according to the frequency hopping rules according to the present invention.

FIG. 3 illustrates uplink data transmission/reception according to the frequency hopping rules according to an embodiment of the present invention.

Before describing FIG. 3, it is made clear that for notational simplicity, data transmission/reception between one BS and one MS is shown in FIG. 3, to which the present invention is not limited. Thus, it is clear and unambiguous that the present invention is applicable to data transmission/reception between two or more MSs and two or more BSs.

Referring to FIG. 3, MS 310 sends a random access signal to BS 330 in step 301; BS 330 measures the Time-of-Arrival (ToA) and strength of the random access signal and then allocates a frequency to MS 310 on the assumption that its CSI is 0 in step 303. That is, BS 330 assumes that the CSI of MS 310 is 0 and sends hopping rule and band allocation information corresponding to CSI=0 to MS 310.

Upon receipt of the hopping rule and band allocation information, MS 310 sends data to BS 330 based on the received information in step 305.

BS 330 measures the coherence times and coherence bandwidths of MSs operating in the CSI=0 mode. In other words, it measures the CSI of MS 310 that sends data in the CSI=0 mode. BS 330 then checks the CSI measurement, ToA, and signal strength and regroups the MS 330 according to the CSI measurement, ToA, and strength. BS 330 sends the CSI measurement and band allocation information for the CSI, i.e. subcarrier/band hopping rule information for the CSI to MS 310 in step 307.

During regrouping, BS 330 groups MSs having the same CIS measurement and similar ToAs and received signal strengths into one group. Specifically, BS 330 sets MS groups with CSI=0, CSI=1, CSI=2 and CSI=3. BS 330 then applies hopping rules to the groups according to their CSIs and notifies the MSs of the groups of the hopping rules.

In step 309, upon receipt of the hopping rule and band allocation information, MS 310 sends data to BS 330 according to the received information.

Figure 4:
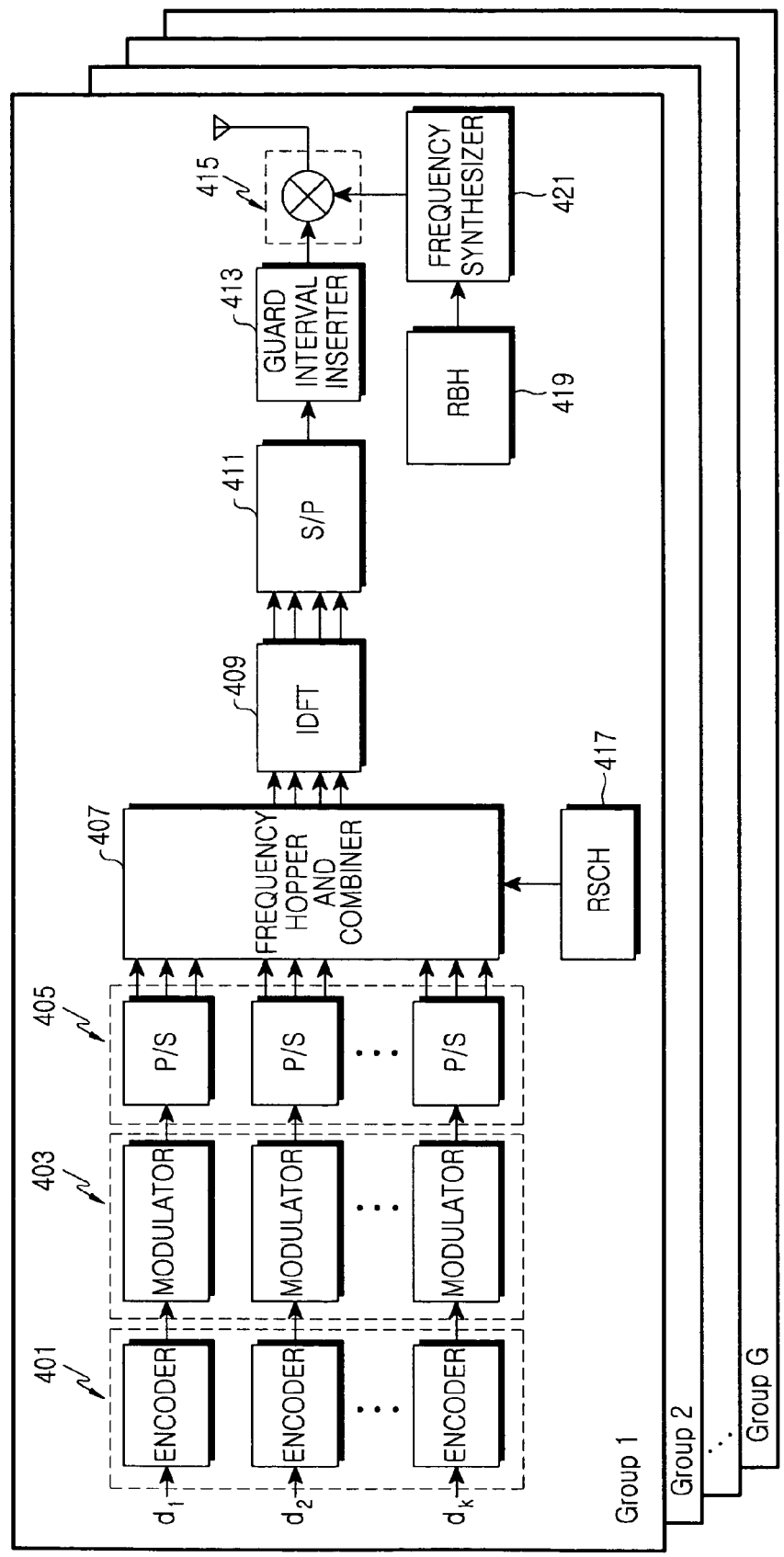
FIG. 4 is a block diagram of a transmitter in a BS according to the present invention.

FIG. 4 is a block diagram of a transmitter in the BS according to an embodiment of the present invention.

The BS transmitter has an independent modulation device for each group defined in the present invention. For example, the BS may have a total of G modulation devices as illustrated in FIG. 4. The following description is made of one of the modulation devices, by way of example. It is assumed that the BS transmitter sends signals for a predetermined number of users, for example, K users, $d_1, d_2, \ldots, d_K$ from each of the G modulation devices. Yet, this is a mere exemplary application and thus other configurations are available.

Referring to FIG. 4, the BS transmitter includes a plurality of encoders 401, a plurality of modulators 403, a plurality of Parallel-to-Serial (P/S) converters 405, a frequency hopper and combiner 407, an Inverse Discrete Fourier Transform (IDFT) processor 409, a Serial-to-Parallel (S/P) converter 411, a guard interval inserter 413, a Radio Frequency (RF) processor 415, a Random SubCarrier Hopper (RSCH) 417, a Random Band Hopper (RBH) 419 and a frequency synthesizer 421.

User signals for MSs, $d_1$ to $d_K$ are provided to the encoders 401. Specifically, a first user signal sequence $d_1$ is provided to a first encoder, a second user signal sequence $d_2$ to a second encoder, and in the same manner, a last user signal sequence $d_K$ to a $K^{th}$ encoder.

The encoders 401 encode the input user signals in a predetermined encoding method such as turbo coding or convolutional coding with a predetermined coding rate. The modulators 403 modulate the coded signals received from the encoders 401 in a predetermined modulation scheme. The P/S converters 405 serialize the modulation symbols received from the modulators 403.

The frequency hopper and combiner 407 maps the serial signals received from the P/S converters 405 to subcarriers allocated to them. The frequency hopper and combiner 407 may be configured separately as a frequency hopper and a user signal combiner. The frequency hopper functions to change a set of subcarriers allocated to each user dynamically according to the fading characteristics of a radio transmission path. That is, the frequency hopper is so configured as to apply frequency hopping to a transmission signal. The user signal combiner combines the K user signals $d_1, d_2, \ldots, d_K$.

The frequency hopper and combiner 407 maps the received signals to subcarriers according to a hopping rule decided by the RSCH 417. The RSCH 417 receives data streams for the users, decides a subcarrier hopping rule for them according to their CSI, and notifies the frequency hopper and combiner 407 of the subcarrier hopping rule.

Thus, the frequency hopper and combiner 407 maps the user signals to subcarriers in correspondence with the subcarrier hopping rule.

The IDFT processor 409 processes the signal received from the frequency hopper and combiner 407. The P/S converter 411 serializes the IDFT signals.

The guard interval inserter 413 inserts a guard interval into the serial signal in order to eliminate interference between an OFDM symbol sent for the previous OFDM symbol time and an OFDM symbol sent for the current OFDM symbol time in the OFDMA communication system. The guard interval can be a cyclic prefix or a cyclic postfix. The cyclic prefix is a copy of last samples of a time-domain OFDM symbol inserted into an effective OFDM symbol, and the cyclic postfix is a copy of first samples of a time-domain OFDM symbol inserted into an effective OFDM symbol.

The RF processor 415 upconverts the guard interval-having RF signal and sends the RF signal in the air through the antenna. Prior to transmission, the RF processor 415 mixes the guard interval-having signal with a frequency value changed according to a band hopping rule notified by the RBH 419. The RBH 419 decides the band hopping rule for the MSs according to their CSI and notifies the frequency synthesizer 421 of the decided band hopping rule. The frequency synthesizer 421 changes a frequency value to independently apply subcarrier frequencies according to the band hopping rule. The RF processor 415 mixes the guard interval-having signal with the frequency value.

As described above, the BS transmitter receives data streams for a plurality of MSs and decides a subcarrier hopping rule according to the CSI of the MSs measured at RSCH 417. Then the BS transmitter maps the data streams to subcarriers at the frequency hopper and combiner 407 according to the subcarrier hopping rule and processes the mapped signals at the IDFT processor 409. RBH 419 decides a band hopping rule according to the CSI and frequency synthesizer 421, changes a frequency value according to the band hopping rule prior to transmission of a final signal.

An RF carrier frequency is applied to each band independently. That is, each band is processed with the independent carrier frequency. Therefore, Peak-to-Average Power Ratio (PAPR) is reduced, compared to an IDFT using one central frequency over a total frequency band.

Figure 5:
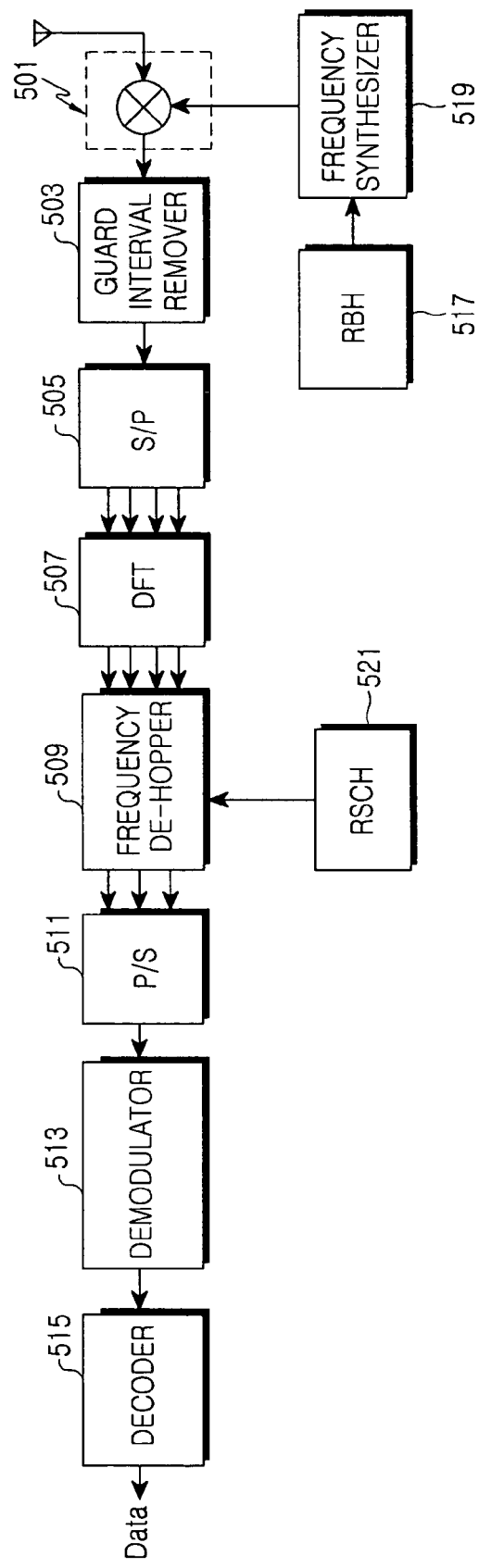
FIG. 5 is a block diagram of a receiver in an MS according to the present invention.

FIG. 5 is a block diagram of a receiver in the MS according to an embodiment of the present invention.

Referring to FIG. 5, the MS receiver includes an antenna, an RS processor 501, a guard interval remover 503, an S/P converter 505, a Discrete Fourier Transform (DFT) processor 507, a frequency de-hopper 509, a P/S converter 511, a demodulator 513, a decoder 515, a Random Band Hopper (RBH) 517, a frequency synthesizer 519, and a Random SubCarrier Hopper (RSCH) 521.

A signal transmitted by the BS transmitter experiences multipath channels, distorted by noise, interference, and signal disturbance, and then is received at the RF processor 501 through the antenna. The RF processor 501 downconverts the received signal to an Intermediate Frequency (IF) signal and provides the IF signal to the guard interval remover 503.

The MS detects a band hopping rule according to a CSI. That is, the RF processor 501 changes a frequency value according to a band hopping rule received from the RBH 517 and processes the received signal to a baseband signal. Specifically, the RBH 517 detects the band hopping rule according to the CSI and the frequency synthesizer 519 changes a frequency value according to the band hopping rule. The RF processor 501 mixes the received signal with the changed frequency value and RF-processes the mixed signal.

The guard interval remover 503 eliminates a guard interval from the signal received from the RF processor 501. The S/P converter 505 transforms the guard interval-free signal to parallel format and the DFT 507 processes the parallel signals.

The frequency de-hopper 509 de-hops subcarrier frequencies in accordance with the frequency hopping method used in the BS transmitter, i.e. a subcarrier hopping rule notified by the RSCH 521. The RSCH 521 decides the subcarrier hopping rule according to the CSI and tells the subcarrier hopping rule to the frequency de-hopper 509. The frequency de-hopper 509 de-hops the subcarriers of the DFT baseband signals according to the subcarrier hopping rule.

The P/S converter 511 converts the parallel signals received from the frequency de-hopper 509. The demodulator 513 demodulates the serial signal in accordance with the modulation scheme used in the BS transmitter. The decoder 515 decodes the demodulated signal in accordance with the coding method used in the BS transmitter, thereby recovering the received data.

As described above, the MS receiver receives a CSI and band allocation information from the BS transmitter. RBH 517 detects a band hopping rule according to the CSI and frequency synthesizer 519 changes a frequency value according to the band hopping rule. A signal received from the BS is processed to a baseband signal using the frequency value. After the baseband signal is DFT-processed, the RSCH 521 decides a subcarrier hopping rule according to the CSI. Then the received data is recovered according to the subcarrier hopping rule.

Figure 6:
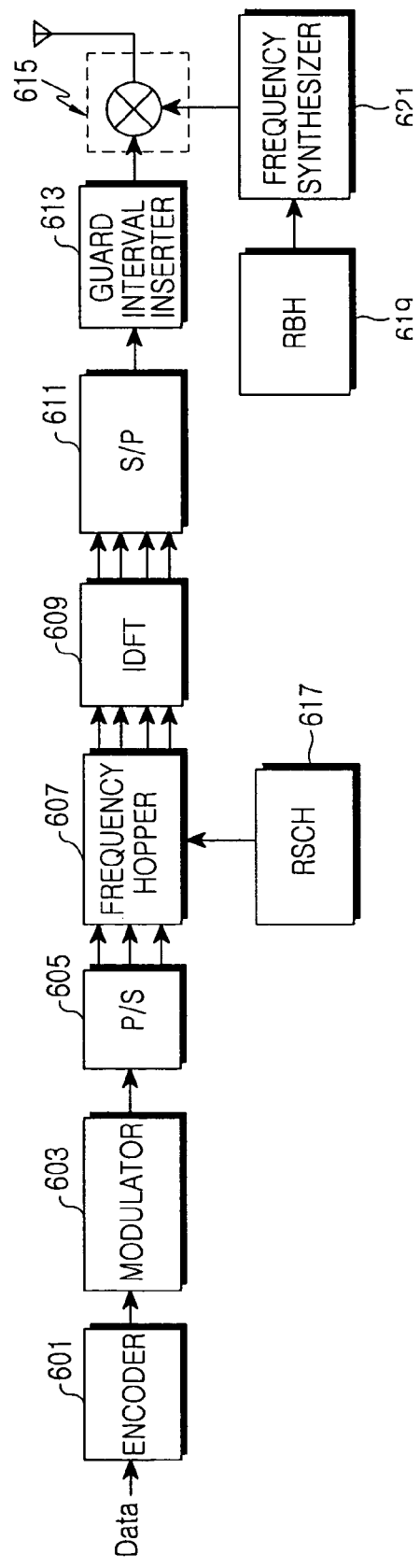
FIG. 6 is a block diagram of a transmitter in the MS according to the present invention.

FIG. 6 is a block diagram of a transmitter in the MS according to an embodiment of the present invention.

Referring to FIG. 6, the MS transmitter includes an encoder 601, a modulator 603, a P/S converter 605, a frequency hopper 607, an IDFT processor 609, an S/P converter 611, a guard interval inserter 613, an RF processor 615, an RSCH 617, an RBH 619, a frequency synthesizer 621, and an antenna.

Upon generation of data to be sent, the encoder 601 encodes the data in a predetermined encoding method such as turbo coding or convolutional coding with a predetermined coding rate. The modulator 603 modulates the coded data in a predetermined modulation scheme. The P/S converter 605 serializes the modulation symbols.

The frequency hopper 607 maps the serial signal received from the P/S converter 605 to subcarriers allocated to it. The frequency hopper functions to change a set of subcarriers allocated to the transmission data according to the fading characteristics of a radio transmission path. During the subcarrier allocation of the transmission data, the frequency hopper 607 uses a hopping rule decided by the RSCH 617. RSCH 617 receives a data stream for the BS, decides a subcarrier hopping rule allocated to MS according to a CSI, and notifies the frequency hopper 607 of the subcarrier hopping rule. Thus the frequency hopper 607 maps the transmission data to subcarriers in accordance with the subcarrier hopping rule.

The IDFT processor 609 processes the signal received from the frequency hopper 607. The P/S converter 611 serializes the IDFT signals.

The guard interval inserter 613 inserts a guard interval into the serial signal in order to eliminate interference between an OFDM symbol sent for the previous OFDM symbol time and an OFDM symbol sent for the current OFDM symbol time in the OFDMA communication system. The guard interval can be a cyclic prefix or a cyclic postfix. The cyclic prefix is a copy of last samples of a time-domain OFDM symbol inserted into an effective OFDM symbol, and the cyclic postfix is a copy of first samples of a time-domain OFDM symbol inserted into an effective OFDM symbol.

The RF processor 615 upconverts the guard interval-having signal to an RF signal and sends the RF signal in the air through the antenna. Prior to transmission, the RF processor 615 mixes the guard interval-having signal with a frequency value changed according to a band hopping rule notified by the RBH 619. The RBH 619 decides the band hopping rule allocated to the MS according to the CSI. Then the frequency synthesizer 621 changes a subcarrier frequency value according to the band hopping rule, and notifies the frequency synthesizer 621 of the frequency value. The RF processor 615 mixes the guard interval-having signal with the frequency value.

As described above, after appropriately encoding and modulating a user signal to be sent, the MS transmitter configures a channel according to the subcarrier hopping rule notified by RSCH 617 and performs an Inverse Discrete Fourier Transform (IDFT) on the channel by the IDFT processor 609. After the transmission signal is converted to a baseband signal through the IDFT, the frequency synthesizer 621 changes the frequency value according to a band hopping rule decided by the RBH 619, prior to transmission of a final signal.

Figure 7:
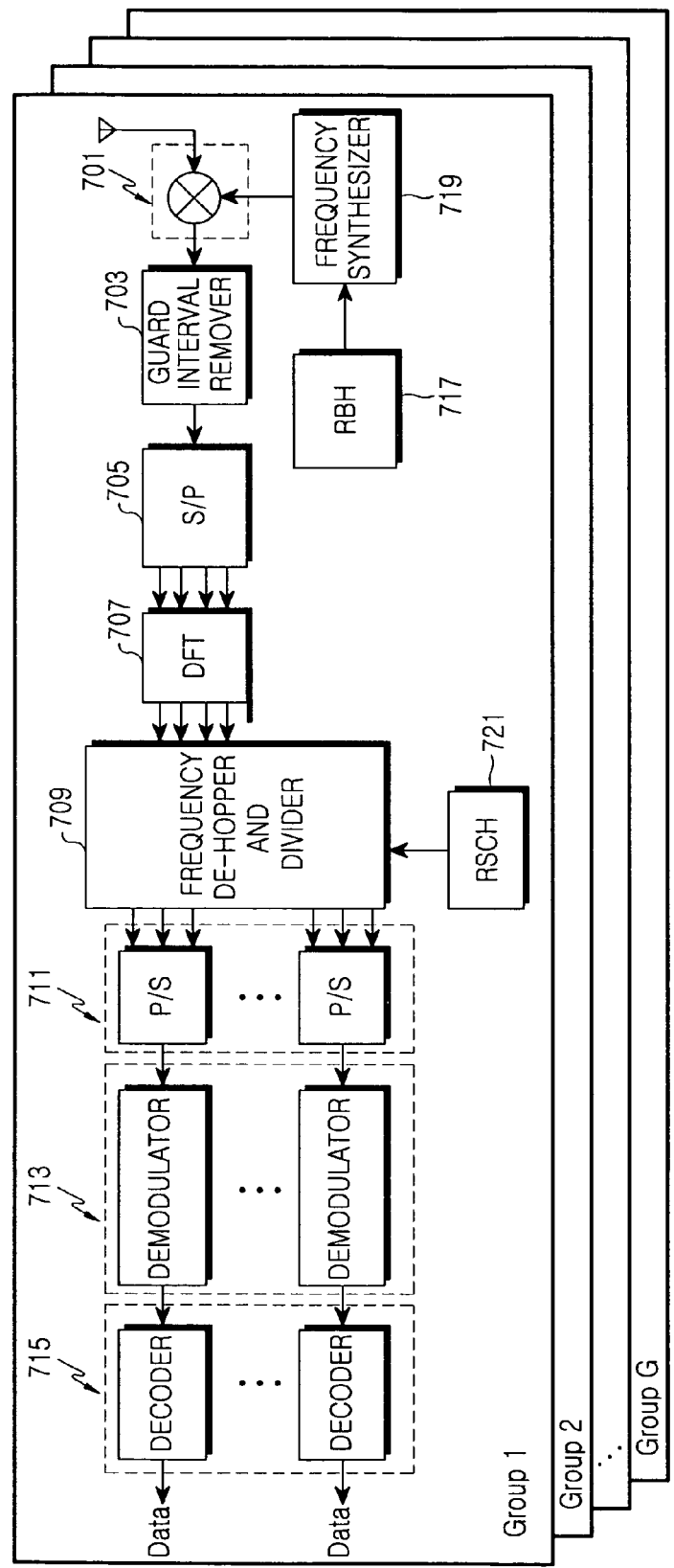
FIG. 7 is a block diagram of a receiver in the BS according to the present invention.

FIG. 7 is a block diagram of a receiver in the BS according to an embodiment of the present invention.

Before describing FIG. 7, the BS receiver has an independent demodulation device for each group defined in the present invention. For example, the BS may have a total of G demodulation devices as illustrated in FIG. 7. The following description is made of one of the demodulation devices, by way of example. It is assumed that the BS receiver allocates signals from a predetermined number of users, for example, K users, $d_1, d_2, \ldots, d_K$ to the G demodulation devices. Yet, this is a mere exemplary application and thus other configurations are available.

Referring to FIG. 7, the BS receiver includes an antenna, an RS processor 701, a guard interval remover 703, an S/P converter 705, a DFT processor 707, a frequency de-hopper and divider 709, a plurality of P/S converters 711, a plurality of demodulators 713, a plurality of decoders 715, an RBH 717, a frequency synthesizer 719, and an RSCH 721.

The RF processor 701 downconverts signals received from MS transmitters through the antenna to IF signals and provides the IF signals to the guard interval remover 703.

The RF processor 701 changes a frequency value according to a band hopping rule received from RBH 717 and processes the received signal to a baseband signal. Specifically, RBH 717 detects the band hopping rule according to the CSI of the MSs and the frequency synthesizer 719 changes a frequency value according to the band hopping rule. The RF processor 701 mixes the received signals with the changed frequency value and RF-processes the mixed signals.

The guard interval remover 703 eliminates guard intervals from the signals received from the RF processor 701. The S/P converter 705 transforms the guard interval-free signals to a parallel format and DFT 707 processes the parallel signals.

The frequency de-hopper and divider 709 de-hops subcarrier frequencies in accordance with the frequency hopping method used in the MS transmitter and separates user data from another. Specifically, the frequency de-hopper and divider 709 de-hops the frequency of data from each user according to a subcarrier hopping rule notified by the RSCH 721. The RSCH 721 decides the subcarrier hopping rule according to the CSI and tells the subcarrier hopping rule to the frequency de-hopper and divider 709. The frequency de-hopper and divider 709 separates the DFT data into user data and de-hops the subcarriers of each user baseband signal according to the subcarrier hopping rule.

The P/S converters 711 serialize the parallel signals received from the frequency de-hopper and divider 709. The demodulators 713 demodulate the serial signals in accordance with the modulation schemes used in the MS transmitters. The decoders 715 decode the demodulated signals in correspondence with the coding methods used in the MS transmitters, thereby recovering the received data.

As described above, the BS receiver receives a CSI and band allocation information from each of MS transmitters. RBH 717 detects a band hopping rule according to the CSI and the frequency synthesizer 719 changes a frequency value according to the band hopping rule. A signal received from the MS is processed to a baseband signal using the frequency value. After the baseband signal is processed, the RSCH 721 decides a subcarrier hopping rule according to the CSI. Then the user signals from the MSs are distinguished according to the subcarrier hopping rule.

As described above, the BS groups MSs according to CSIs so that MSs with the same CSI belongs to the same group. The BS sends band allocation information to each of the groups so that the MSs of the group can perform subcarrier hopping and band hopping according to their CSI. The MSs send data in the band allocated according to the allocation information, i.e. the CSI. This operation can also be performed in reverse.

In accordance with the present invention, four CSIs are defined by combining small and large coherence times $T_c$ with small and large coherence bandwidths $B_c$ in order to represent channel statuses. MSs are grouped according to their CSIs so that MSs with the same CSI are in the same group. Then a total frequency band is divided into equal bands which are allocated to the groups, and rules are defined for the groups, in which band hopping and in-band subcarrier hopping pattern speeds are differentiated according to the CSIs. Thus, the constraint of CSI transmission is relieved and system data rate is increased.

As described above, the frequency resource operating apparatus and method for a BWA communication system according to the present invention reduces the constraint of CSI transmission from MSs and also reduces excess signaling overhead of the system. Also, band allocation for data transmission according to CSIs leads to the increase of data rate in the system.

While the invention has been shown and described with reference to certain preferred embodiments thereof, it will be understood by those skilled in the art that various changes in form and details may be made therein without departing from the spirit and scope of the invention as further defined by the appended claims.

What is claimed is:

1. A method of transmitting and receiving data using Channel State Information (CSI) in a mobile communication system, comprising the steps of:
   setting, by a Base Station (BS), the CSI of a Mobile Station (MS) to an initial CSI and transmitting data to the MS according to the initial CSI;
   transmitting, by the MS, a downlink CSI to the BS;
   setting, by the BS, a group of the MS based on the downlink CSI; and
   transmitting, by the BS, data to the MS according to a frequency hopping pattern for the group of the MS among frequency hopping patterns preset for predetermined groups,
   wherein the frequency hopping pattern for the group of the MS is determined according to whether coherence time measured by the MS runs over a preset time or a coherence bandwidth measured by the MS is greater than a threshold,
   wherein the frequency hopping pattern for the group of the MS is generated according to a frequency hopping speed that is faster than a currently used frequency hopping speed on at least one of a band basis and a subcarrier basis, when the coherence time runs over the preset time or the coherence bandwidth is greater than the threshold.

2. The method of claim 1, wherein setting the group of the MS comprises setting the group of the MS to a group including other MSs with a same CSI.

3. The method of claim 1, wherein the downlink CSI is one among a plurality of CSIs determined based on the coherence time and the coherence bandwidth.

4. The method of claim 1, wherein the frequency hopping pattern for the group of the MS is generated according to a frequency hopping speed that is slower than the currently used frequency hopping speed on at least one of the band basis and the subcarrier basis, when the coherence time does not run over the preset time or the coherence bandwidth is not greater than the threshold.

5. A method of transmitting and receiving data using Channel State Information (CSI) in a mobile communication system, comprising the steps of:

receiving, by a Base Station (BS), a random access signal from at least one Mobile station (MS);

determining, by the BS, the CSI of the at least one MS to be an initial CSI and allocating frequency resources to the at least one MS based on the initial CSI;

transmitting, by the at least one MS, data using the allocated frequency resources to the BS;

measuring, by the BS, the CSI of the at least one MS operating based on the initial CSI;

resetting, by the BS, a group of the at least one MS according to the measured CSI;

allocating, by the BS, different frequency resources to the reset group of the at least one MS according to the CSI of the reset group; and transmitting, by the BS, data to the at least one MS using a frequency hopping pattern for the reset group that is determined according to whether a coherence time measured by the at least one MS runs over a preset time or a coherence bandwidth measured by the at least one MS is greater than a threshold, wherein transmitting data to the at least one MS comprises transmitting the data using a frequency hopping pattern that is determined according to a frequency hopping speed that is faster than a currently used frequency hopping speed on at least one of a band basis and a subcarrier basis, when the coherence time runs over the preset time or the coherence bandwidth is greater than the threshold.

6. The method of claim 5, wherein measuring the CSI comprises measuring the coherence time and the coherence bandwidth of the at least one MS.

7. The method of claim 5, wherein resetting the group of the at least one MS comprises resetting the group of the at least one MS to a group including MSs with a same CSI.

8. The method of claim 5, wherein the transmitting the data to the at least one MS comprises transmitting the data using different frequency hopping patterns for each group, based on a CSI of each group.

9. The method of claim 5, wherein transmitting the data to the at least one MS comprises transmitting the data using a frequency hopping pattern that is determined according to a frequency hopping speed that is slower than the currently used frequency hopping speed on least one of the band basis and the subcarrier basis, when the coherence time does not run over the preset time or the coherence bandwidth is not greater than the threshold.

10. A system for transmitting and receiving data using Channel State Information (CSI) in a mobile communication system, comprising:

a Base Station (BS) for grouping Mobile Stations (MSs) into predetermined groups according to CSIs of the MSs, applying different frequency hopping patterns to the groups according to the CSIs of the groups, and transmitting and receiving data to and from the MSs included in the groups using the frequency hopping patterns applied to the groups; and an MS from among the MSs for transmitting and receiving data to and from the BS using a frequency hopping pattern applied to a group to which the MS belongs from among the groups, wherein the frequency hopping pattern is determined according to whether a coherence time measured by the MS runs over a preset time or a coherence bandwidth measured by the MS is greater than a threshold, wherein the frequency hopping pattern is generated according to a frequency hopping speed that is faster than a currently used frequency hopping speed on at least one of a band basis and a subcarrier basis, when the coherence time runs over the reset time or the coherence bandwidth is greater than the threshold.

11. The system of claim 10, wherein the BS comprises a transmitter for determining first frequency hopping patterns for the MSs according to the CSIs of the MSs, mapping subcarriers to a frequency area according to the first frequency hopping patterns, and changing frequency values according to second frequency hopping patterns corresponding to the CSIs.

12. The system of claim 10, wherein the BS comprises a receiver for receiving the CSIs of the MSs, applying first frequency hopping patterns according to the CSIs of the MSs, changing frequency values according to the first frequency hopping patterns, performing a baseband process according to the changed frequency values, and distinguishing signals from the MSs according to second frequency hopping patterns corresponding to the CSIs of the MSs.

13. The system of claim 10, wherein the MS comprises a transmitter for configuring a channel according to a decided first frequency hopping pattern, changing a frequency value according to a second frequency hopping pattern corresponding to the CSI of the MS, and transmitting data using the changed frequency value.

14. The system of claim 10, wherein the MS comprises a receiver for changing a frequency value according to a first frequency hopping pattern corresponding to a decided CSI, performing a baseband process according to the changed frequency value, and processing received data according to a second frequency hopping pattern corresponding to the CSI.

15. The system of claim, wherein the frequency hopping pattern is generated according to a frequency hopping speed that is slower than the currently used frequency hopping speed on at least one of the band basis and the subcarrier basis, when the coherence time does not run over the preset time or the coherence bandwidth is not greater than the threshold.

* * * * *